(No Model.)

J. H. C. WATTS.
LIGHTNING ROD.

No. 406,681. Patented July 9, 1889.

Witnesses
H. S. Rohrer,
Parker W. Sweet, Jr.

Inventor
John H. C. Watts,
By his Attorney
Fred. W. Royce.

UNITED STATES PATENT OFFICE.

JOHN HENRY CHARLES WATTS, OF BALTIMORE, MARYLAND.

LIGHTNING-ROD.

SPECIFICATION forming part of Letters Patent No. 406,681, dated July 9, 1889.

Application filed April 12, 1889. Serial No. 307,006. (No model.)

*To all whom it may concern:*

Be it known that I, JOHN HENRY CHARLES WATTS, a citizen of the United States, residing at Baltimore, in the State of Maryland, have invented new and useful Improvements in Lightning-Rods; and I do hereby declare the following to be a full, clear, and exact description of said invention, reference being had to the accompanying drawings, and to the letters or figures of reference marked thereon, which form a part of this specification.

My invention relates to improvements in couplings for lightning-rods, the same being designed more particularly for use in connection with that class of lightning-rods which are formed of lengths or sections joined together by means of a screw-threaded tenon upon one section fitting within a corresponding screw-threaded opening in the shank of the opposite section or length of rod, the object of my improvements being to provide a novel and efficient coupling, one that will serve to prevent the joints of the sections or lengths of rods from becoming loose, as also to insure of a good connection being formed at each joint.

To these ends my improvements consist, essentially, of a flat resilient spring, which is interposed between two sections or lengths of rod in such manner as to form a perfect joint or union between the two, as will be hereinafter fully described, and specifically designated in the claims.

Figure 1:
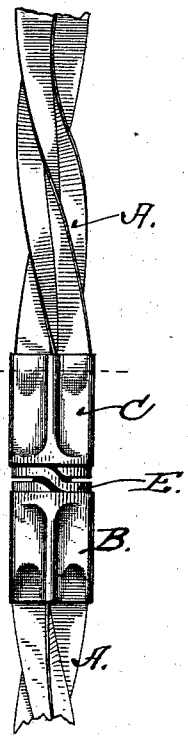
Figure 2:
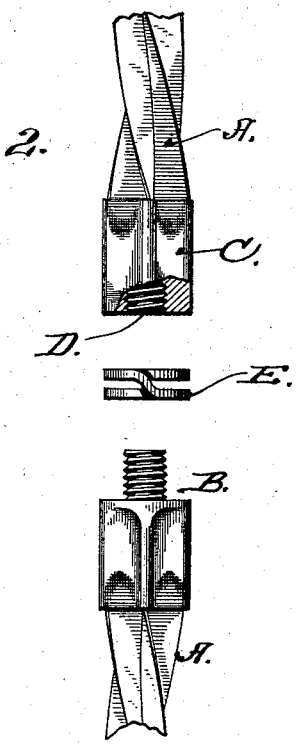

In the accompanying drawings, Figure 1 represents a side elevation of two sections of a lightning-rod embodying my improvements, and Fig. 2 a detail sectional view of the same.

Similar letters of reference occurring on both figures indicate like parts.

For a more ready understanding of my present invention, it may be observed that it has heretofore been customary to unite or join two lengths or sections of rod together by means of a screw-threaded shank upon one section fitting within a correspondingly-screw-threaded opening in the shank of the opposite section; but the coupling of two or more sections together in such manner has been found to be objectionable, in that the said sections are liable to become loose at the joints during the operation of putting up the lightning-rod or becoming loosened after being placed in position through the action of strong winds or other causes.

By means of my improvements the interposed resilient spring or washer between the joints of the several sections or lengths of the rod serves by its frictional contact therewith to provide a perfect joint and to insure of a good electrical connection being made and sustained at all times.

Referring to the accompanying drawings, A represents the lengths or sections of the lightning-rod, each having upon one end a screw-threaded tenon B and upon the opposite end a shank C, provided with a screw-threaded opening D, the screw-threaded tenon B of one section being adapted to fit the corresponding screw-threaded opening D of the opposite section, as fully shown in the drawings.

E represents a flat resilient spring, which is interposed, upon the screw-threaded tenon, between the joints of two sections or lengths of the lightning-rod, and by reason of its frictional contact with the shanks of the two sections serves to prevent the joints of the same from becoming loose and at the same time insures of a good electrical connection being made and maintained at the joints. Should at any time the joints become loose through the action of storms or wind, the resilient spring will take up the lost space between the joints, and preserves at the same time a perfect electrical connection between the sections.

Having thus described my invention, I claim as new and desire to secure by Letters Patent—

1. A coupling for lightning-rods, consisting of the flat resilient spring interposed between the screw-threaded shanks of two sections or lengths, substantially in the manner and for the purpose specified.

2. In a coupling for lightning-rods, the flat resilient spring E, in combination with the screw-threaded shanks B and C of sections A, substantially as and for the purpose specified.

In testimony whereof I affix my signature in presence of two subscribing witnesses.

JOHN HENRY CHARLES WATTS.

Witnesses:
   GEO. H. WINCHESTER,
   WM. H. JONES.